(12) United States Patent
Odera

(10) Patent No.: US 11,797,807 B2
(45) Date of Patent: Oct. 24, 2023

(54) INFORMATION PROCESSING APPARATUS WITH NOTIFICATIONS PERTAINING TO SPOT COLOR AND NON-SPOT COLOR OBJECTS, AND INFORMATION PROCESSING METHOD AND STORAGE MEDIUM THEREFOR

(71) Applicant: CANON KABUSHIKI KAISHA, Tokyo (JP)

(72) Inventor: Satoru Odera, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/738,880

(22) Filed: May 6, 2022

(65) Prior Publication Data

US 2022/0366200 A1 Nov. 17, 2022

(30) Foreign Application Priority Data

May 17, 2021 (JP) .................................. 2021-083082

(51) Int. Cl.
*G06K 15/02* (2006.01)
*G06K 15/00* (2006.01)

(52) U.S. Cl.
CPC ....... *G06K 15/1878* (2013.01); *G06K 15/002* (2013.01); *G06K 15/1885* (2013.01)

(58) Field of Classification Search
CPC .................................................. G06K 15/1878
USPC ........................................................ 358/1.9
See application file for complete search history.

(56) References Cited

U.S. PATENT DOCUMENTS

| | | | | |
|---|---|---|---|---|
| 2010/0085587 A1* | 4/2010 | Hayward | ............. | H04N 1/6033 358/1.9 |
| 2012/0262740 A1* | 10/2012 | Yamada | ................. | H04N 1/628 358/1.9 |
| 2018/0338066 A1* | 11/2018 | Tsuwano | ................. | H04N 1/387 |

FOREIGN PATENT DOCUMENTS

| | | |
|---|---|---|
| JP | 2011-244301 | 12/2011 |
| JP | 2018-195251 | 12/2018 |

OTHER PUBLICATIONS

Onyx Graphics: "Designing with White and Specialty Ink", Apr. 26, 2013, XP055290042 (Year: 2013).*
Onyx Graphics: "Designing with White and Specialty Ink", Apr. 26, 2013, XP055290042.
Extended European Search Report dated Oct. 13, 2022 in counterpart EP Application No. 22173182.1.

* cited by examiner

*Primary Examiner* — Jacky X Zheng
(74) *Attorney, Agent, or Firm* — Venable LLP

(57) ABSTRACT

Provided is a technique capable of preventing generation of an output result that is not intended by a user. A notification unit is included which gives a notification regarding a color of at least one of a spot color object or a non-spot color object having color information matching spot-color color information of the spot color object in a case where the spot color object and the non-spot color object are present in a predetermined display region as a result of editing by an editing unit.

14 Claims, 11 Drawing Sheets

US 11,797,807 B2

INFORMATION PROCESSING APPARATUS WITH NOTIFICATIONS PERTAINING TO SPOT COLOR AND NON-SPOT COLOR OBJECTS, AND INFORMATION PROCESSING METHOD AND STORAGE MEDIUM THEREFOR

BACKGROUND OF THE INVENTION

Field of the Invention

The present invention relates to an information processing apparatus, an information processing method, and a storage medium for editing an image to be printed using an ink that develops a spot color such as a fluorescent color or a metallic color.

Description of the Related Art

In a case where a printing apparatus capable of performing printing by using a spot color ink performs printing using a spot color such as a fluorescent color, a gold color, or a silver color, a spot color RGB value representing the spot color is set within a normal RGB value range. Japanese Patent Application Laid-Open No. 2011-244301 discloses a technique for setting such a spot color RGB value.

Image data output to such a printing apparatus is displayed on a display device and subjected to editing, a printing result check, and so on in advance. At this time, since a normal display device cannot display spot colors, each spot color object to be printed in a spot color is displayed using a display RGB value for display. Here, in a case of using a spot color RGB value as the display RGB value, the image displayed on the display device may give an impression different from the actual printing result to the user, Thus, for example, an RGB value similar to the color to be printed is set as the display RGB value.

It is desired to prevent generation of an output result that is not intended by the user.

SUMMARY OF THE INVENTION

The present invention has been made in view of the above problem and provides a technique capable of preventing generation of an output result that is not intended by a user.

In the first aspect of the present invention, there is provided an information processing method including:
allowing editing of an object displayed in a predetermined display region; and
changing a display in the predetermined display region based on a content of the editing in the allowing editing, wherein
the allowing editing includes allowing editing of
a spot color object for which spot-color color information associated with a spot color is set and which is to be printed by using at least a spot color ink according to the spot-color color information, and
a non-spot color object which has predetermined color information and is to be printed not by using the spot color ink but by using a normal ink, which is not the spot color ink, according to the predetermined color information, and
the information processing method further comprises giving a notification regarding a color of at least one of the spot color object or the non-spot color object having color information matching the spot-color color information of the spot color object based on the fact that the spot color object and the non-spot color object are present in the predetermined display region as a result of the editing in the allowing editing.

In the second aspect of the present invention, there is provided an information processing apparatus which comprises an editing unit capable of editing an object displayed in a predetermined display region, and which changes a display in the predetermined display region based on a content of the editing by the editing unit, wherein
the editing unit is capable of editing
a spot color object for which spot-color color information associated with a spot color is set and which is to be printed by using at least a spot color ink according to the spot-color color information, and
a non-spot color object which has predetermined color information and is to be printed not by using the spot color ink but by using a normal ink, which is not the spot color ink, according to the predetermined color information, and
the information processing apparatus further comprises a notification unit that gives a notification regarding a color of at least one of the spot color object or the non-spot color object having color information matching the spot-color color information of the spot color object based on the fact that the spot color object and the non-spot color object are present in the predetermined display region as a result of the editing by the editing unit.

In the third aspect of the present invention, there is provided a non-transitory computer readable storage medium storing a program for causing a computer to function as an information processing apparatus which comprises an editing unit capable of editing an object displayed in a predetermined display region, and which changes a display in the predetermined display region based on a content of the editing via the editing unit, wherein
the editing unit is capable of editing
a spot color object for which spot-color color information associated with a spot color is set and which is to be printed by using at least a spot color ink according to the spot-color color information, and
a non-spot color object which has predetermined color information and is to be printed not by using the spot color ink but by using a normal ink, which is not the spot color ink, according to the predetermined color information, and
the information processing apparatus further comprises a notification unit that gives a notification regarding a color of at least one of the spot color object or the non-spot color object having color information matching the spot-color color information of the spot color object based on the fact that the spot color object and the non-spot color object are present in the predetermined display region as a result of the editing by the editing unit.

According to the present invention, it is possible to prevent generation of an output result that is not intended by a user.

Further features of the present invention will become apparent from the following description of exemplary embodiments with reference to the attached drawings.

DESCRIPTION OF THE EMBODIMENTS

Exemplary embodiments of an information processing apparatus, an information processing method, and a storage medium will be described below with reference to the accompanying drawings. Note that the following embodiments do not limit the present invention, and not all the combinations of the features described in these embodiments are necessarily essential for the solution to be provided by the present invention. Moreover, the relative positions, shapes, and the like of the components described in the embodiments are mere examples, and there is no intension to limit the scope of the present invention only to these.

First Embodiment

First, an information processing apparatus according to a first embodiment will be described with reference to FIGS. 1 to 5. The information processing apparatus according to the present embodiment is connected to a printing apparatus that performs printing on a print medium, and is configured to be capable of executing various types of editing on an image to be printed by the printing apparatus such as changing the position of an object (moving the object), enlarging or reducing an object, and adding or deleting an object. Note that, in the present embodiment, the description will be given based on a case where the information processing apparatus is provided as a separate apparatus from the printing apparatus. However, the configuration may be such that a control part or the like in the printing apparatus has the functions of the information processing apparatus to be described below <Configuration of Information Processing Apparatus>

Figure 1:
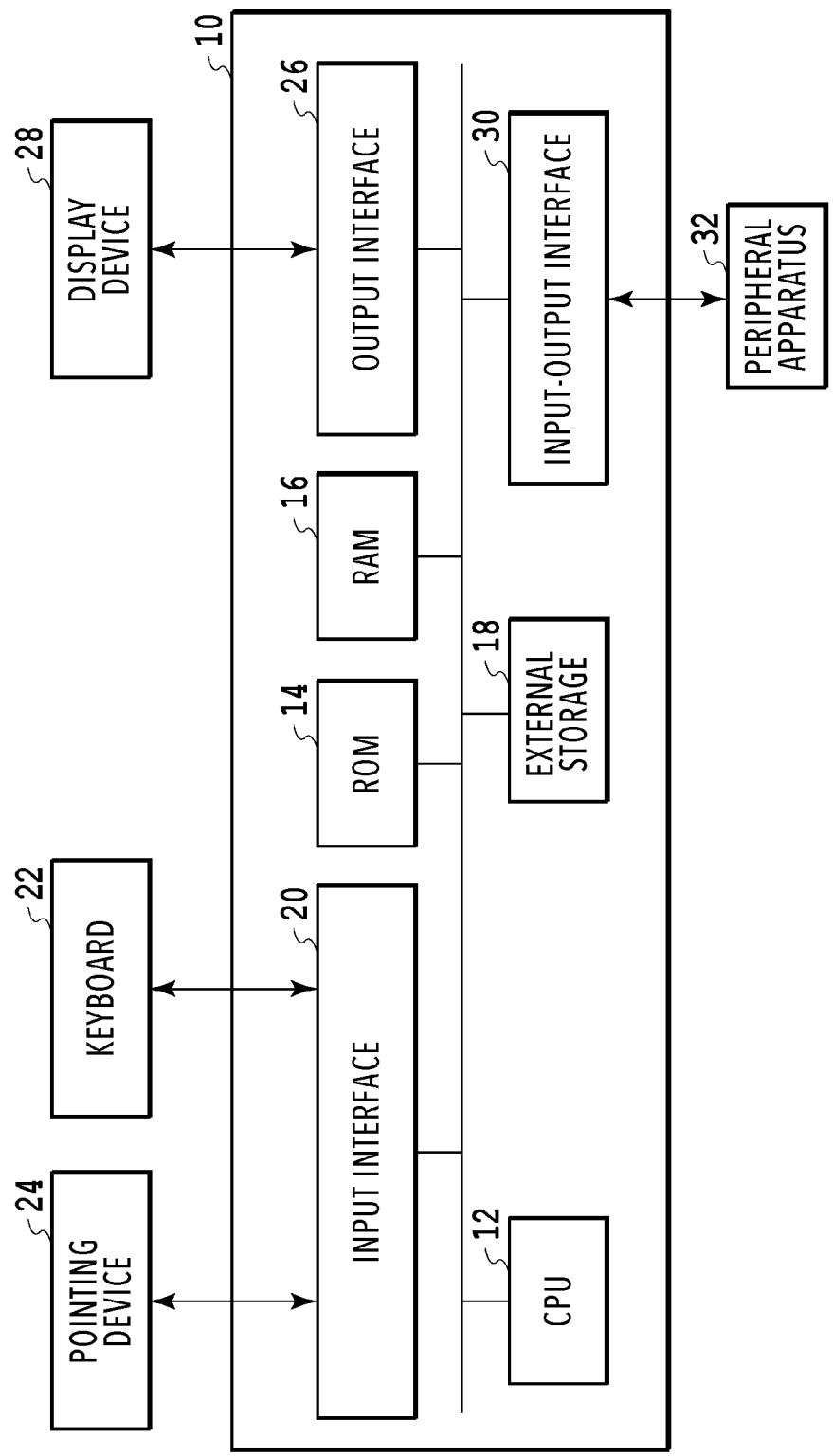
FIG. 1 is a block diagram schematically illustrating an information processing apparatus according to an embodiment.

FIG. 1 is a block diagram schematically illustrating the information processing apparatus according to the embodiment. An information processing apparatus 10 in FIG. 1 is, for example, a general-purpose personal computer and includes a central processing unit (CPU) 12, a ROM 14, a RAM 16, and an external storage 18. The CPU 12 performs control of the entire information processing apparatus 10 such as executing programs and activating hardware. The ROM 14 stores fixed data such as control programs to be executed by the CPU 12, data tables, an incorporated operating system (OS), and programs, and so on. In the present embodiment, each control program stored in the ROM 14 performs software execution control such as scheduling, task switching, and interrupt handling, for example, under the control of the OS stored in the ROM 14.

The RAM 16 is a static random access memory (SRAM), a dynamic random access memory (DRAM), or the like that needs a backup power supply, Note that the RAM 16 may hold data by using a primary cell for data backup (not illustrated). In this case, the RAM 16 is capable of storing data such as program control variables in a non-volatile manner. Also, in the RAM 16, a memory area is provided, in which setting information on the information processing apparatus 10, management data on the information processing apparatus 10, and the like are stored. The RAM 16 is also used as a main memory and a work area for the CPU 12. The external storage 18 stores various applications, content data to be handled by these applications, and the like.

The information processing apparatus 10 includes an input interface 20 and is connected to input devices such as a keyboard 22 and a pointing device 24 via this input interface 20. Moreover, the information processing apparatus 10 includes an output interface 26 and is connected to a display device 28 via this output interface 26. The information processing apparatus 10 further includes an input-output interface 30 and is connected to a peripheral apparatus 32, which is a printing apparatus that performs printing based on image data output from the information processing apparatus 10, via this input-output interface 30. Note that the printing apparatus to be connected is configured to be capable of performing printing by using at least a spot color ink (described later) based on the image data output from the information processing apparatus 10. With these components, the user can perform operations such as inputting commands and various pieces of information by using the input devices such as the keyboard 22 and the pointing device 24 while checking contents displayed on the display device 28.

Any of various publicly known display devices, such as a light emitting diode (LED) display or a liquid crystal display (LCD), can be used as the display device 28, which is a display region for the information processing apparatus 10. On the display device 28, display of various pieces of information, notification of the state of the information processing apparatus 10, and so on are performed, Incidentally, the configuration of the display device 28 may be such that it is equipped with a software keyboard provided with various keys such as numeric input keys, mode setting keys, an enter key, a cancellation key, and a power key to receive inputs from the user via the display device 28, Contents to be displayed on the display device 28 are controlled by the CPU 12.

<Printing System>

Figure 2:
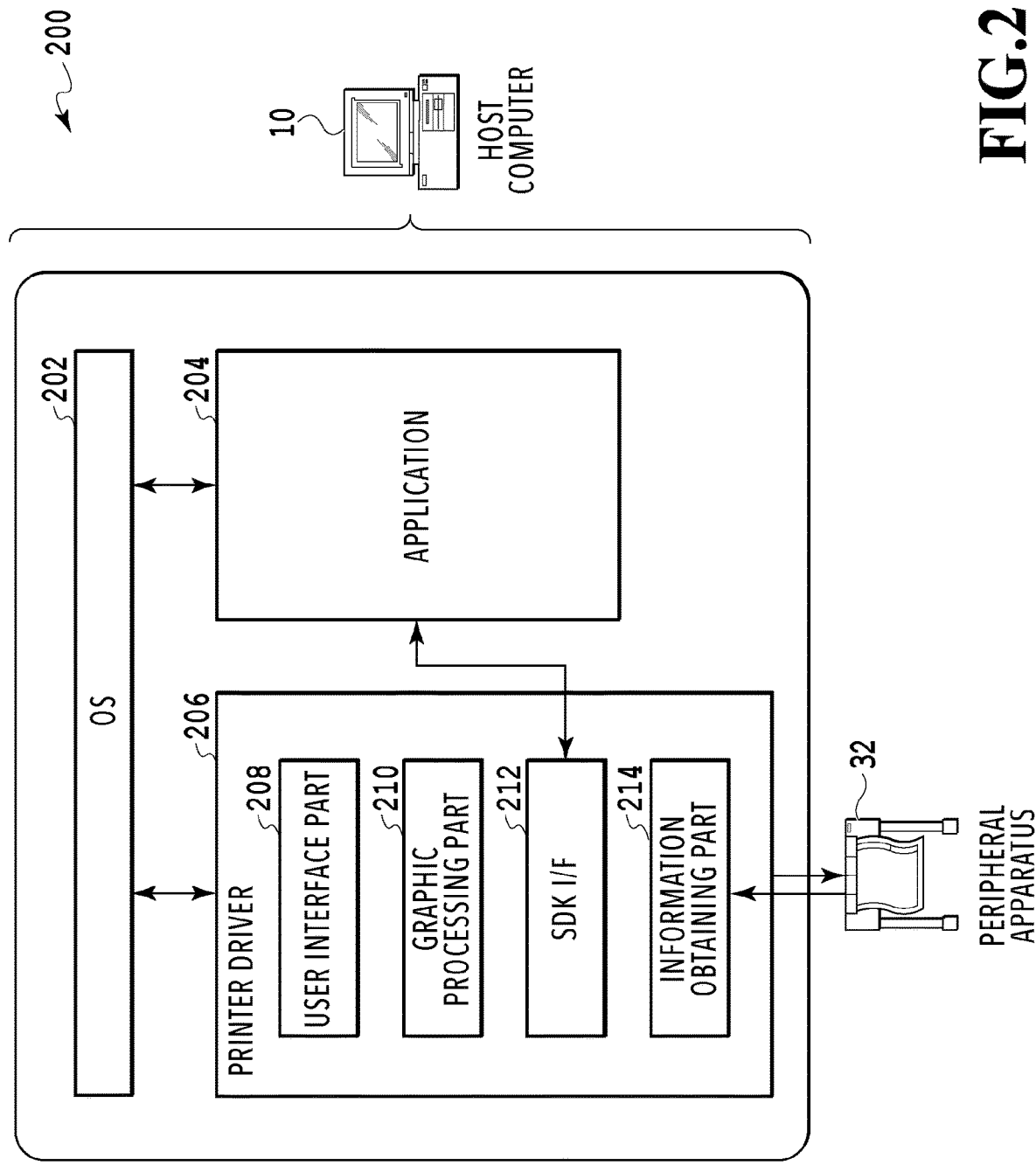
FIG. 2 is a block diagram of a printing system including the information processing apparatus.

Next, a printing system 200 including the information processing apparatus 10 and the peripheral apparatus 32 will be described. FIG. 2 is a block diagram of the printing system including the information processing apparatus in FIG. 1. As described above, the peripheral apparatus 32 is a printing apparatus capable of performing printing by using spot color inks. A spot color ink is an ink that develops a spot color and, for example, an ink that develops a color at the time of printing which cannot be displayed with the SRGB color space. That is, the printing apparatus as the peripheral apparatus 32 is configured to be capable of performing spot color printing which is printing using inks of spot colors other than normal inks.

"Normal ink" is an ink for performing printing in a process color and is an ink of a color such as cyan (C), magenta (M), yellow (Y), or black (K), which is a basic process color. Note that a process color is a color expressed by one of C, M, Y, and K or a combination of two or more of C, M, Y, and K. Also, in the present embodiment, a fluorescent pink ink and a fluorescent orange ink are used as the spot color inks. A spot color is a color different from any of process colors and is a color that cannot be expressed with only one of C, M, Y, and K or a combination of two or more of C, M, Y, and K. However, the configuration is not limited to this one. The number and colors of spot color inks may be any number and colors, and a non-fluorescent color ink(s) may be used. For example, a violet ink, a green ink, an orange ink, a gold ink, and/or a silver ink may be used as a spot color ink(s). Also, an ink of another metallic color(s) may be used. Further, an ink obtained by blending a spot color ink and another ink (e.g., a normal ink) may be used as a spot color ink.

The information processing apparatus 10 includes an OS 202, an application program (hereinafter referred to as "application") 204, and a printer driver 206 as its pieces of software (programs). The application 204 is a piece of software for creating contents to be printed and is, for example, an image editing application for creating poster data. In this printing system 200, for image data on a character or graphic desired to be subjected to the later-described spot color printing, the user designates a particular RGB data value(s), i.e., a spot color RGB value(s) being an RGB value(s) associated with a spot color(s), on the application 204. Then, in response to receiving a print request from the user, the application 204 issues a print instruction to the OS 202. In response to receiving the print instruction, the OS 202 then lets its OS printing system (not illustrated) handle the processing for the printing. Here, the following description will be given on the assumption that the OS printing system cooperates with the printer driver 206 provided by the printing apparatus' vendor.

In response to receiving a request to display a print setting screen from the application 204, the OS printing system requests the printer driver 206 to display the print setting screen, and the printer driver 206 in turn displays the print setting screen on a user interface part 208. On the print setting screen, the user can designate the size, type, and the like of paper serving as a print medium and designate spot color printing. In a case of performing spot color printing, the user firstly selects the spot color(s) to be used as a print setting of the printer driver 206. Thereafter, on the application 204, the user creates contents and, for the image data on a character or a graphic for which the user wishes to use a spot color ink(s), designates a spot color RGB value(s) corresponding to the above spot color ink(s) to be used.

The printer driver 206 provides a software development kit (SDK) I/F 212. Using the SDK I/F 212, the application 204 can configure print settings on the application 204 without having the printer driver 206 open the print setting screen. Further, the printer driver 206 is capable of obtaining information on the peripheral apparatus 32 with an information obtaining part 214. The printer driver 206 is capable of displaying settings adjusted to the functionality of the peripheral apparatus 32 with the user interface part 208 and supporting the settings with the SDK i/F 212 based on the information obtained from the peripheral apparatus 32. The printer driver 206 is also capable of displaying a region for receiving an input on whether to set spot color printing, and switches on or off the spot color printing based on an operation on the region. Specifically, the printer driver 206 is capable of displaying, for example, a fluorescent pink spot color printing setting. The fluorescent pink spot color printing setting is a region for receiving a selection on whether to enable spot color printing for printing pixels with an RGB value corresponding to fluorescent pink in fluorescent pink (fluorescent pink spot color printing). In a case where the fluorescent pink spot color printing is not enabled, pixels with the RGB value corresponding to fluorescent pink will be printed in a color that is not fluorescent pink. Thus, the above region can be seen as a region for receiving a setting on whether to print pixels with a particular RGB value in fluorescent pink or in a color different from fluorescent pink. The region can also be seen as, for example, a region for receiving a setting on whether to perform printing by using the spot color ink or to perform printing not by using the spot color ink but by using the normal inks, such as the C, M, Y, and K inks.

In a case where the fluorescent pink spot color printing is set, then if there is a pixel with the RGB value corresponding to fluorescent pink among pixels contained in print data generated by the printer driver 206, the peripheral apparatus 32 prints that pixel with the fluorescent pink spot color ink. In a case where the fluorescent pink spot color printing is not set, then even if there is a pixel with the RGB value corresponding to fluorescent pink among the pixels contained in the print data generated by the printer driver 206, the peripheral apparatus 32 forms an image with the RGB value of that pixel expressed with the inks of the process colors, such as C, M, Y, and K. That is, in the above case, the fluorescent pink spot color ink (color material) is not used. In other words, by enabling the fluorescent pink spot color printing, the pixel with the RGB value corresponding to fluorescent pink will be printed in the color that is to be printed by using the spot color. Incidentally, another spot color printing setting may be displayed similarly to the fluorescent pink spot color printing setting.

In response to a print instruction from the application 204, image data and the print settings of the application 204 are passed to a graphic processing part 210 of the printer driver 206 via the OS printing system. The graphic processing part 210 converts these pieces of data into a data format which the peripheral apparatus 32 can interpret, and sends them as a print job to the peripheral apparatus 32, Then, an ink(s) is(are) ejected from the print head of the peripheral apparatus 32 onto a print medium fed to the peripheral apparatus 32 to thereby form an image thereon. Here, in a case where spot color printing is set, a spot color ink is ejected for a pixel(s) for which a spot color RGB value is designated in image data designated to be printed in a spot color.

Here, a description will be given of an example where the peripheral apparatus 32 is capable of using a spot color ink to perform printing with predetermined six colors each using a spot color in a case where the printer driver 206 sets spot color printing. In the case where the printer driver 206 sets spot color printing, a pixel in image data with a spot color RGB value corresponding to the set spot color is printed by using the spot color ink. In this example, each of the predetermined six colors is allocated a spot color RGB value.

One spot color RGB value is, for example, R=255 (0xFF), G=0 (0x00), and B=255 (OAT), A pixel with this RGB value will be printed in fluorescent pink, which is one of the spot colors, by using the fluorescent pink ink. Also, another spot color RGB value is, for example, R=255 (0xFF), G=85

(0x55), and B=0 (0x00). A pixel with this RGB value is printed in orange, which is one of the spot colors, by using the fluorescent pink, magenta, and yellow inks blended together. In this case, if the configuration is, for example, such that an orange ink can be used as a spot color ink, the pixel with the above RGB value may be printed in orange by using only the orange ink. In other words, it suffices that a pixel with a spot color RGB value corresponding to a spot color be printed by using at least a spot color ink, and it is not essential to perform printing with a spot color ink and a normal ink(s) blended together.

Note that, in spot color printing too, only the normal inks are used to print pixels other than those with the spot color RGB values corresponding to the spot colors. Also, spot color printing is executed in a case where the spot color printing is enabled by a user operation. That is, in a case where no spot color printing setting is enabled, pixels with the spot color RGB values corresponding to the spot colors are printed with only the normal inks by referring to their RGB values in the usual manner.

Specifically, in a case where the printer driver 206 enables the fluorescent pink spot color printing setting and image data to be sent contains a pixel with an RGB value of R=2.55, G=0, and B=255, the peripheral apparatus 32 can perform fluorescent pink spot color printing. The same applies to the other spot colors. That is, in a case where the printer driver 206 enables the print setting of one spot color and image data to be sent contains a pixel with the spot color RGB value corresponding to the one spot color, the peripheral apparatus 32 can perform corresponding spot color printing. Incidentally, in a case where the printer driver 206 enables a spot color printing setting but the image data does not contain any pixel with the spot color RGB value corresponding to the spot color printing, the spot color printing is impossible. In the case where the spot color printing is impossible, an error (warning) may be notified of.

<Monitoring Process and Display Process>

The information processing apparatus 10 with the configuration described above launches the application 204 to perform an editing process on image data such as adding an object. In the case where the information processing apparatus 10 launches the application 204, an editing screen for editing image data is displayed on the display device 28, and the editing process starts. Note that the application 204 is caused to function by the CPU 12. In the present embodiment, the CPU 12 functions as an editing part capable of editing image data. Also, in the present embodiment, the application 204 is capable of editing an image to be generated by superimposing a plurality of objects. The application 204 is also capable of executing an editing process of adding (newly superimposing) or deleting an object and/or changing the color, size, and/or position of an object based on an editing operation received from the user. In a case where such an editing operation is performed, the objects after the editing are superimposed to generate a single new image. An object is, for example, an image, a figure, or text. The application 204 manages, for each object to be edited by the application 204, whether it is a spot color object or a non-spot color object based on information associated with the object. A spot color object refers to an object to be printed by using at least a spot color ink. A non-spot color object refers to an object to be printed by using only a normal ink(s) and not using any spot color ink. Also, the application 204 is capable of editing an object into a non-spot color object or a spot color object based on an editing operation received from the user. Specifically, in a case where the color of an object is designated or changed to a spot color, that object is set as a spot color object. In a case where the color of an object is designated or changed to a normal color, which is not a spot color, that object is set as a non-spot color object.

In parallel with the editing process, the application 204 also executes a monitoring process of monitoring whether there is a non-spot color object with an RGB value matching the spot color RGB value of a spot color object to be printed in a spot color. Moreover, a display process of displaying a warning message is performed in parallel with the editing process and the monitoring process. The monitoring process and the display process are executed by the application 204. Note that the image data edited by the editing process is stored in the external storage 18 or the like, and will be output by the CPU 12 as appropriate via the input-output interface 30 to the peripheral apparatus 32 and used by it.

Note that the editing-target image data may be one created by the information processing apparatus 10 or one input from another apparatus in advance. Also, color information (RGB value) is set for each object and the background in the editing-target image data based on the colors to be expressed at the time of printing. Further, in the editing screen, each object in the image data is displayed with a color applied to it based on the set color information. Note that the display device 28 may be unable to express spot colors. Thus, for each spot color object, a spot color RGB value to be output to the peripheral apparatus 32 and also a display RGB value for display in the editing screen are set. That is, each spot color object has two RGB values—spot color RGB value and display RGB value. While the spot color RGB value and the display RGB value may be the same value, they are different values in some cases. In the case where the spot color RGB value and the display RGB value are different values, there is a possibility that an output result which is not intended by the user will be generated. For this reason, the monitoring process and the display process to be described later are performed.

As describe above, in the editing screen, a non-spot color object to be printed by using a normal ink(s) is expressed with an RGB value corresponding to its color to be developed at the time of printing whereas a spot color object is displayed with its display RGB value. In this way, the user can identify the spot color object in the editing screen. The user checks the image displayed in the editing screen and performs various types of editing on this image. After the editing, the image data to which the contents of the editing have been applied is stored in the external storage 18 and output to the peripheral apparatus 32. The setting of the spot color RGB value and the display RGB value in the image data and the various types of editing of the image data will not be set forth in detail in the following description since publicly known techniques can be used.

Figure 3:
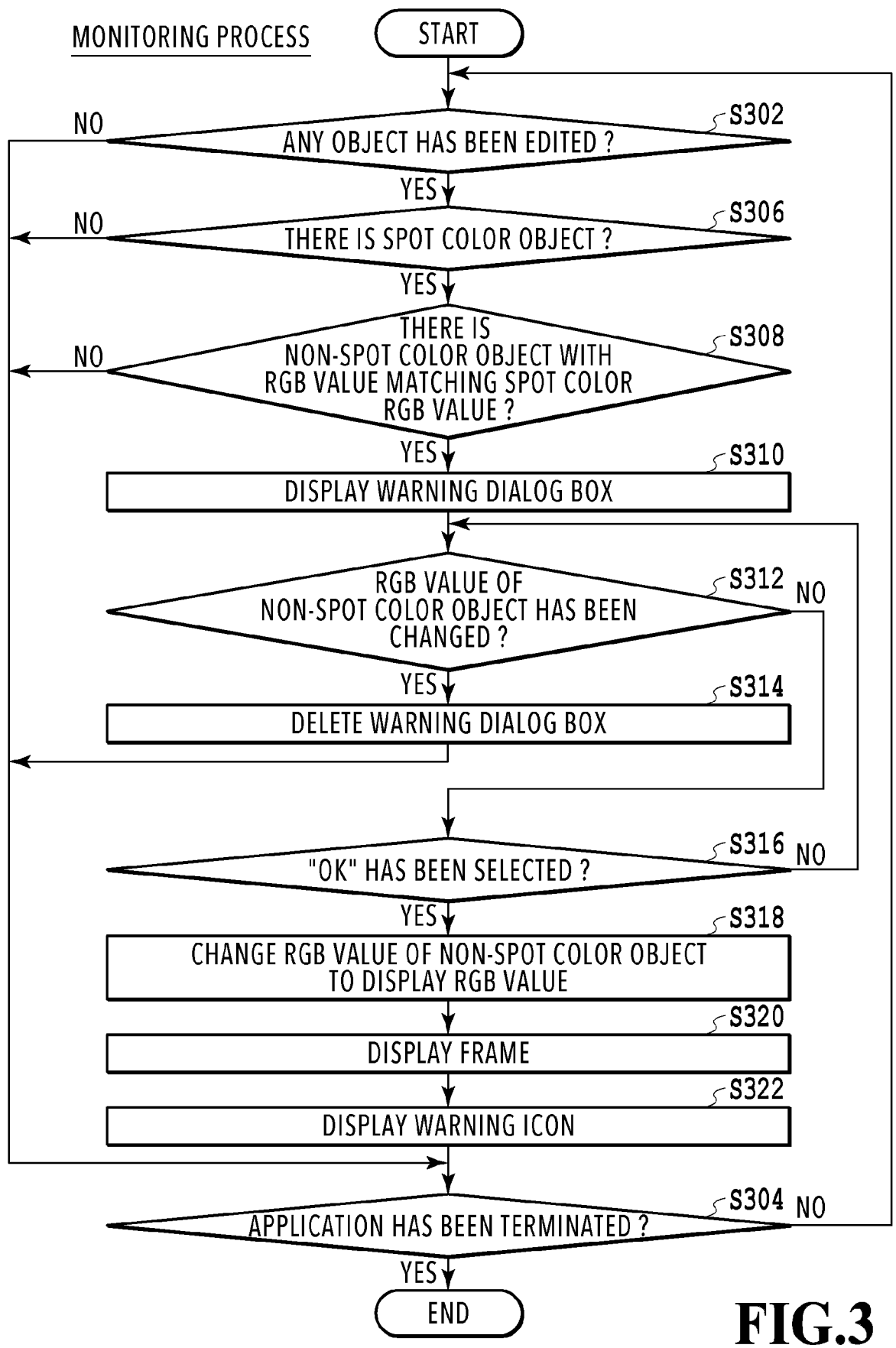
FIG. 3 is a flowchart illustrating a specific processing routine in a monitoring process.
Figure 4:
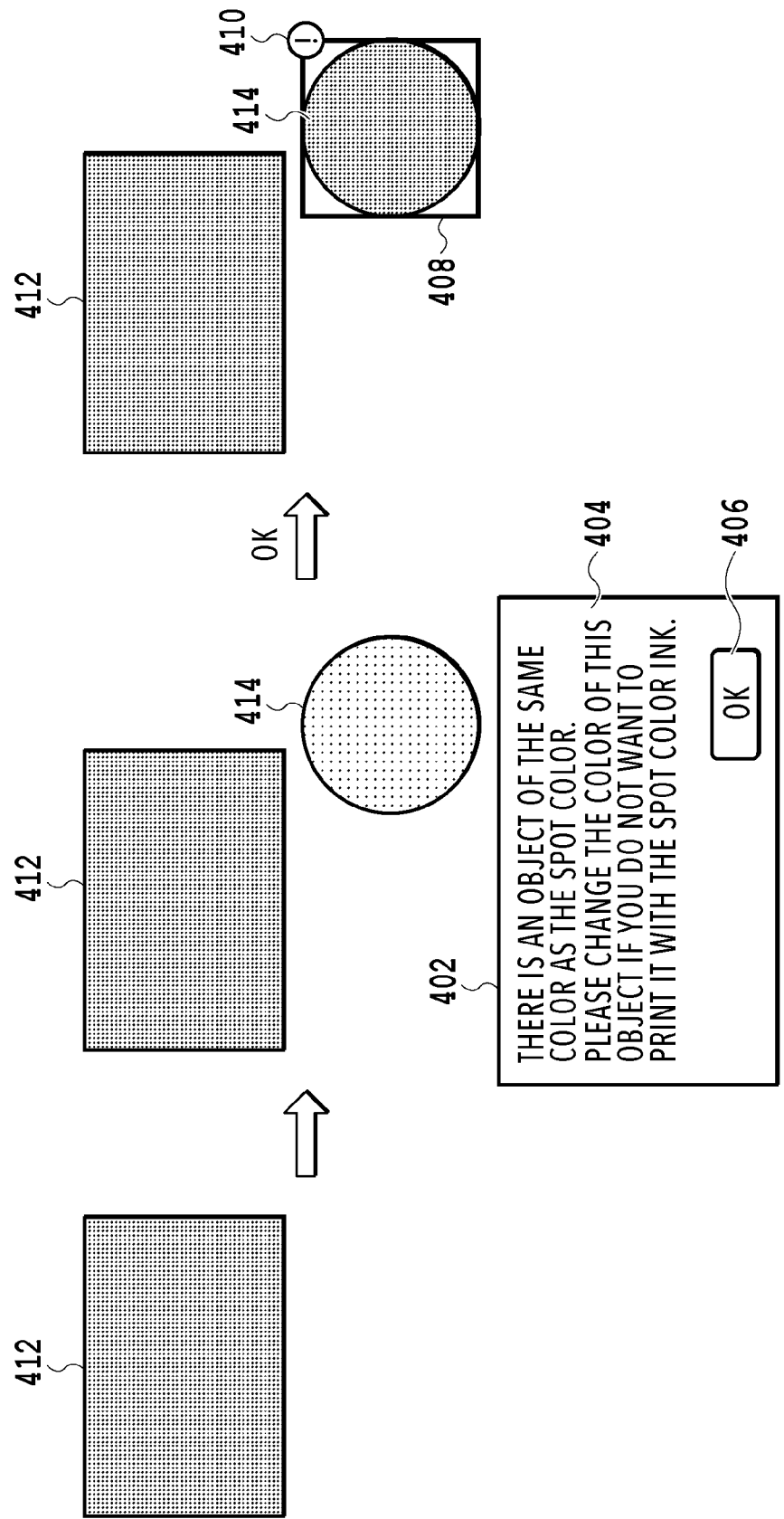
FIG. 4 is a diagram illustrating a display example of a warning dialog box, a frame, and a warning icon.
Figure 5:
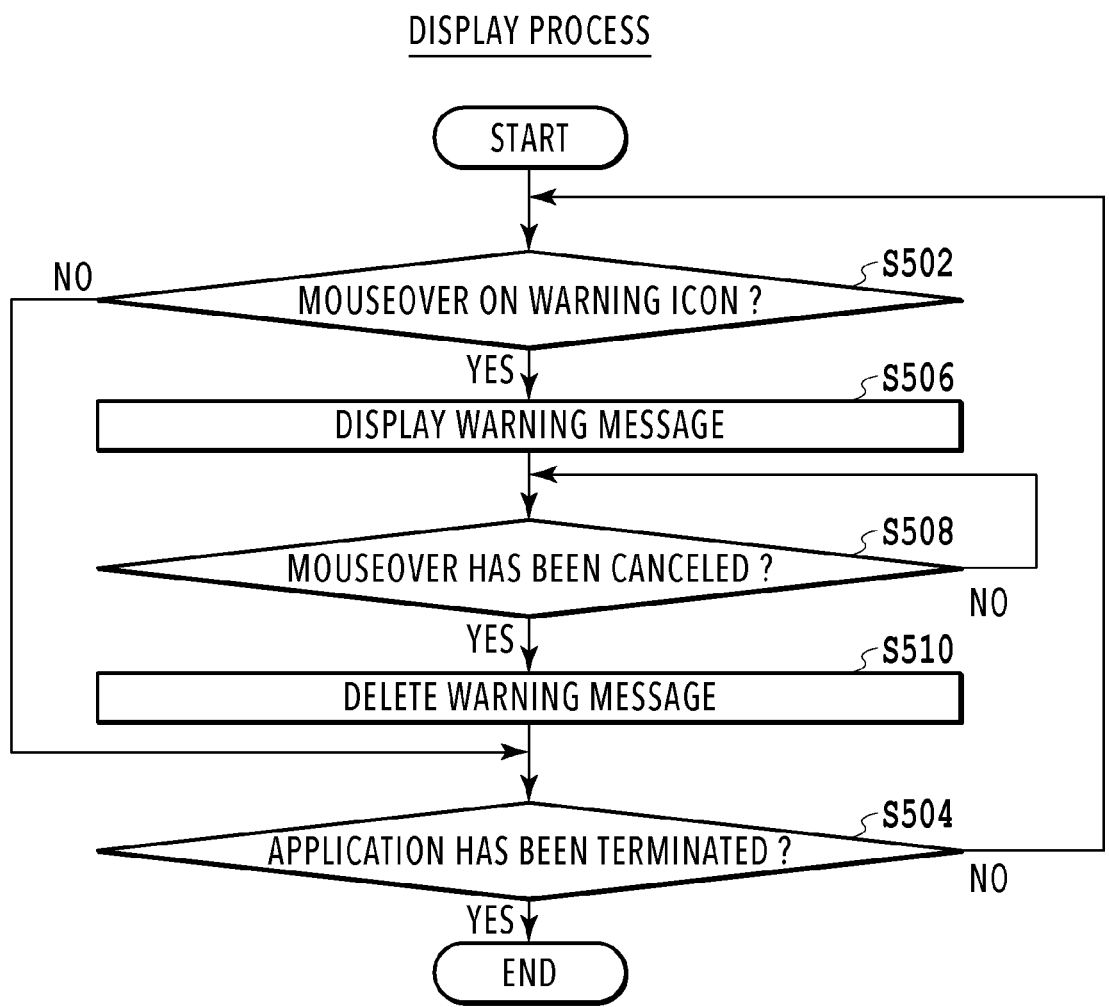
FIG. 5 is a flowchart illustrating a specific processing routine in a display process.
Figure 6:
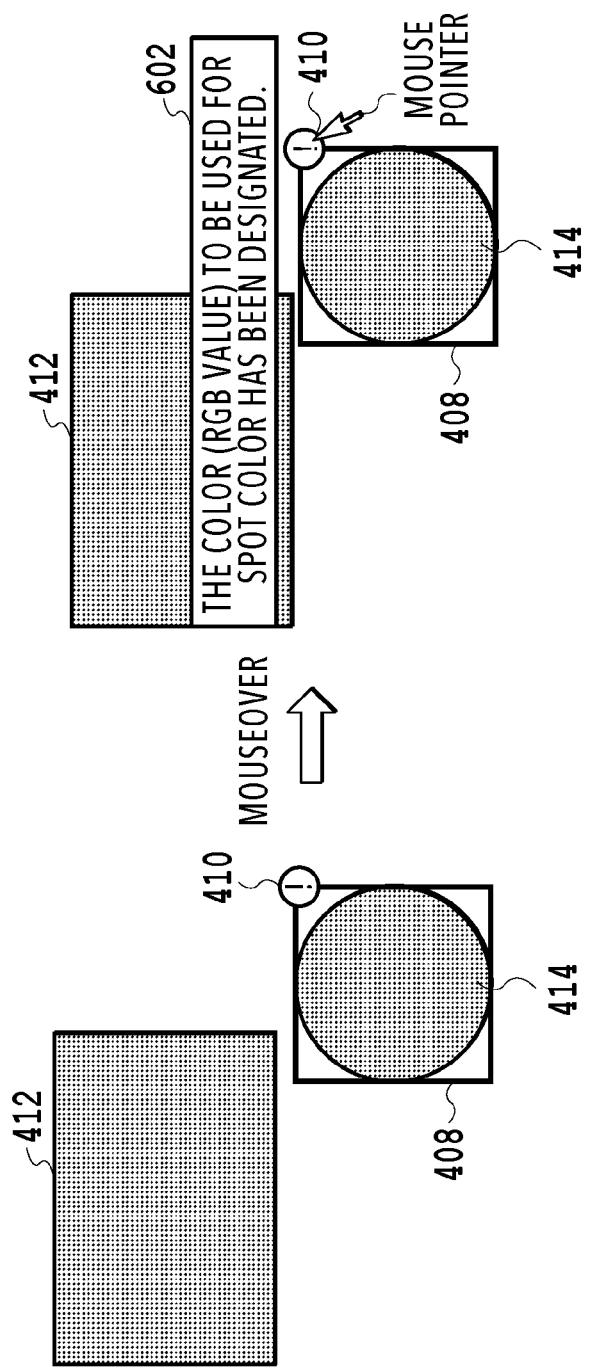
FIG. 6 is a diagram illustrating a display example of a warning message.

FIG. 3 is a flowchart illustrating a specific processing routine in the monitoring process. FIG. 4 is a diagram illustrating a display example of a warning dialog box, a frame, and a warning icon. FIG. 5 is a flowchart illustrating a specific processing routine in the display process. FIG. 6 is a diagram illustrating a display example of a warning message. The CPU 12 performs the series of processes illustrated in the flowcharts of FIGS. 3 and 5 by loading the application 204 stored in the ROM 14 to the RAM 16 and executing it. Alternatively, the functions of some or all of the steps in FIGS. 3 and 5 may be implemented with hardware such as an ASIC or an electric circuit. Meanwhile, the sign "S" in the description of each process means a step in the flowchart =Monitoring Process=

In a case where the application 204 is launched and the editing screen is displayed on the display device 28, the information processing apparatus 10 starts a monitoring process of monitoring whether a non-spot color object with an RGB value matching the spot color RGB value of a spot color object is added and, if so, notifying of a warning dialog box. In response to the start of the monitoring process, the CPU 12 firstly determines whether any object has been edited in the editing screen based on inputs from the input devices such as the keyboard 22 and the pointing device 24 (S302). Note that the object editing includes not only changing the color, size, and/or position of an object already displayed in the editing screen but also adding a new object to the editing screen.

If determining in S302 that no object has been edited, the CPU 12 determines whether the application 204 has been terminated (S304), and returns to S302 if determining that the application has not been terminated. If determining in S304 that the application 204 has been terminated, the CPU 12 terminates this monitoring process. If, on the other hand, determining in S302 that an object has been edited, the CPU 12 determines whether there is a spot color object in the image (S306).

If determining in S306 that there is no spot color object in the image, the CPU 12 proceeds to S304. If determining in S306 that there is a spot color object in the image, the CPU 12 determines whether there is a non-spot color object with an RGB value matching the spot color RGB value set for the spot color object present in the image (S308), Specifically, in S308, the CPU 12 determines whether the RGB value of a non-spot color object added and the spot color RGB value set for the spot color object present in the image match each other. Note that, in a case where there area plurality of different spot color objects, the CPU 12 compares the spot color RGB value of each spot color object and the RGB value of the added non-spot color object to determine whether they match each other.

If determining in S308 that there is no non-spot color object with the RGB value matching the spot color RGB value of the spot color object, i.e., the RGB value of the added non-spot color object does not match the spot color RGB value, the CPU 12 proceeds to S304. If determining in S308 that there is a non-spot color object with the RGB value matching the spot color RGB value of the spot color object, i.e., the RGB value of the added non-spot color object matches the spot color RGB value, the CPU 12 displays a warning dialog box 402 (S310). Here, in the editing screen, the spot color object is displayed with a display RGB value, which is different from its spot color RGB value, as mentioned earlier. For this reason, if there is a non-spot color object with the RGB value matching the spot color RGB value (that is, if such a non-spot color object has been added), the user identifies that the non-spot color object displayed with the spot color RGB value is an object with a different RGB value from the spot color object.

However, in the image data to which the editing in the editing screen has been applied, the spot color RGB value is set for the spot color object displayed with its display RGB value. Note that the image data to which the editing in the editing screen has been applied is image data to be used in printing and is image data generated by superimposing a plurality of objects in the editing screen. Also, the same spot color RGB value is set for the non-spot color object with the RGB value matching the spot color RGB value. For this reason, the peripheral apparatus 32 having received the image data uses a spot color ink to print not only the spot color object originally intended to be printed with the spot color ink but also the non-spot color object with the RGB value matching the spot color RGB value. The user cannot realize that the printing result will be as above only from the colors (RGB values) of the objects in the editing screen. Also, a printing result as above may differ from the printing result intended by the user.

To address this, in the present embodiment, the warning dialog box 402 is displayed (see FIG. 4) in the case where a non-spot color object with the RGB value matching the spot color RGB value is added as a result of editing. The warning dialog box 402 is also displayed in a case where a non-spot color object with the RGB value matching the spot color RGB value is generated as a result of editing involving changing the color of any object. For example, as illustrated in FIG. 4, in a case where a spot color object 412 is present in an image and a non-spot color object 414 with an RGB value matching its spot color RGB value is added to the image, the warning dialog box 402 is displayed near the non-spot color object 414. Note that the display position of the warning dialog box 402 is not limited to this position, and the warning dialog box 402 may be displayed at any position within the editing screen. Also, the warning dialog box 402 may be displayed in such a fashion (e.g., highlighted or flashed) that the spot color object and non-spot color object of interest are easily recognizable.

In the warning dialog box 402, a notification 404 is displayed as a prompt to change the RGB value of the non-spot color object if the user does not wish to print the non-spot color object with the spot color ink, along with a warning sentence indicating that the RGB value of the non-spot color object matches the spot color RGB value. Moreover, in the warning dialog box 402, an "OK" selection button 406 for completing the notification by the warning dialog box 402 is displayed.

In the case where the warning dialog box 402 is displayed, the CPU 12 subsequently determines whether the RGB value of the non-spot color object matching the spot color RGB value has been changed (S312). If determining in S312 that the RGB value of the non-spot color object has been changed, the CPU 12 deletes the warning dialog box 402 (S314) and proceeds to S304. In S314, the CPU 12 deletes a frame 408 and a warning icon 410 along with the warning dialog box 402. If determining in S312 that the RGB value of the non-spot color object has not been changed, the CPU 12 determines whether the "OK" selection button 406 has been selected (S316).

If determining in S316 that the "OK" selection button 406 has not been selected, the CPU 12 returns to S312. If determining in S316 that the "OK" selection button 406 has been selected, the CPU 12 changes the RGB value of the non-spot color object matching the spot color RGB value to the display RGB value of the spot color object for which the spot color RGB value is set (S318), That is, in S318, the CPU 12 changes the RGB value of the non-spot color object matching the spot color RGB value to an RGB value matching the display RGB value of the spot color object for which the spot color RGB value is set. As a result, in the editing screen, the added non-spot color object is displayed in the same color as the spot color object. This is to make it easier for the user to visually recognize the non-spot color object 414, which will be printed in the spot color, after closing the warning dialog box 102.

Thereafter, the CPU 12 displays the frame 408 around the non-spot color object whose RGB value has been changed to the display RGB value (S320), displays the warning icon 410 on the frame 108 (S322), and then proceeds to S304. As illustrated in FIG. 3, the frame 408 is a rectangular bold line surrounding the non-spot color object 414. Also, as illustrated in FIG. 3, the warning icon 410 is located on a corner of the frame 408 and is displayed by using a mark that can call for attention of the user, such as the exclamation mark, for example. Note that the shape and display form of the frame 408 are not limited to the above and may be any shape and display form as long as the user can easily visually recognize the frame in the editing screen. Also, the position of the warning icon 410 is not limited to the above position, and may be any position on the frame 408 or a position outside the frame 408 as long as it is near the frame 408.

=Display Process=

In the case where the warning icon 110 is displayed in the editing screen by the monitoring process, the information processing apparatus 10 starts a display process of displaying a warning message. In response to the start of the display process, the CPU 12 firstly determines whether mouseover has been performed on the warning icon 410 (S502). In S502, the CPU 12 determines whether a mouse pointer is positioned over the warning icon 410 based on the movement of the pointing device 24 and the display on the display device 28.

If determining in S502 that mouseover has not been performed on the warning icon 410, the CPU 12 determines whether the application 204 has been terminated (S504). If determining in S504 that the application 204 has not been terminated, the CPU 12 returns to S502. If determining in S504 that the application 204 has been terminated, the CPU 12 terminates this display process.

If determining in S502 that mouseover has been performed on the warning icon 410, the CPU 12 displays a warning message 602 (S506). The warning message 602 is a notification indicating that the color set as the spot color (spot color RGB value) has been designated for the non-spot color object (see FIG. 6). Thereafter, the CPU 12 determines whether the mouseover on the warning icon 110 has been canceled (S508). If determining in S508 that the mouseover on the warning icon 410 has not been canceled, the CPU 12 returns to S508. If determining in S508 that the mouseover on the warning icon 410 has been canceled, the CPU 12 deletes the warning message 602 (S510) and proceeds to S502. Thus, in the present embodiment, the CPU 12 functions as a notification part that notifies the user of warnings via the warning dialog box 402 and the warning message 602.

As described above, the information processing apparatus 10 according to the present embodiment displays the warning dialog box 402 in the case where a spot color object and a non-spot color object with an RGB value matching the spot color RGB value of this spot color object are present together in an image after being edited. This warning dialog box 402 gives a notification regarding changing the RGB value of the non-spot color object matching the spot color RGB value along with a warning sentence indicating that the non-spot color object is present. In the present embodiment, the notification regarding the change is a notification as a prompt to change the color, i.e., the RGB value, of the non-spot color object. In this way, the user's intention is properly reflected on the image data after being edited.

Moreover, the non-spot color object whose RGB value has been changed to a display RGB value is surrounded by the frame 408, and the warning icon 410 is displayed on the frame 408. Furthermore, performing mouseover on the warning icon 410 notifies of a warning indicating that a color representing spot color printing has been set for the non-spot color object. In this way, the user can more properly recognize the non-spot color object, which may be printed in the spot color at the time of printing, so that the user's intention will be more properly reflected on the printing result.

Second Embodiment

Figure 7:
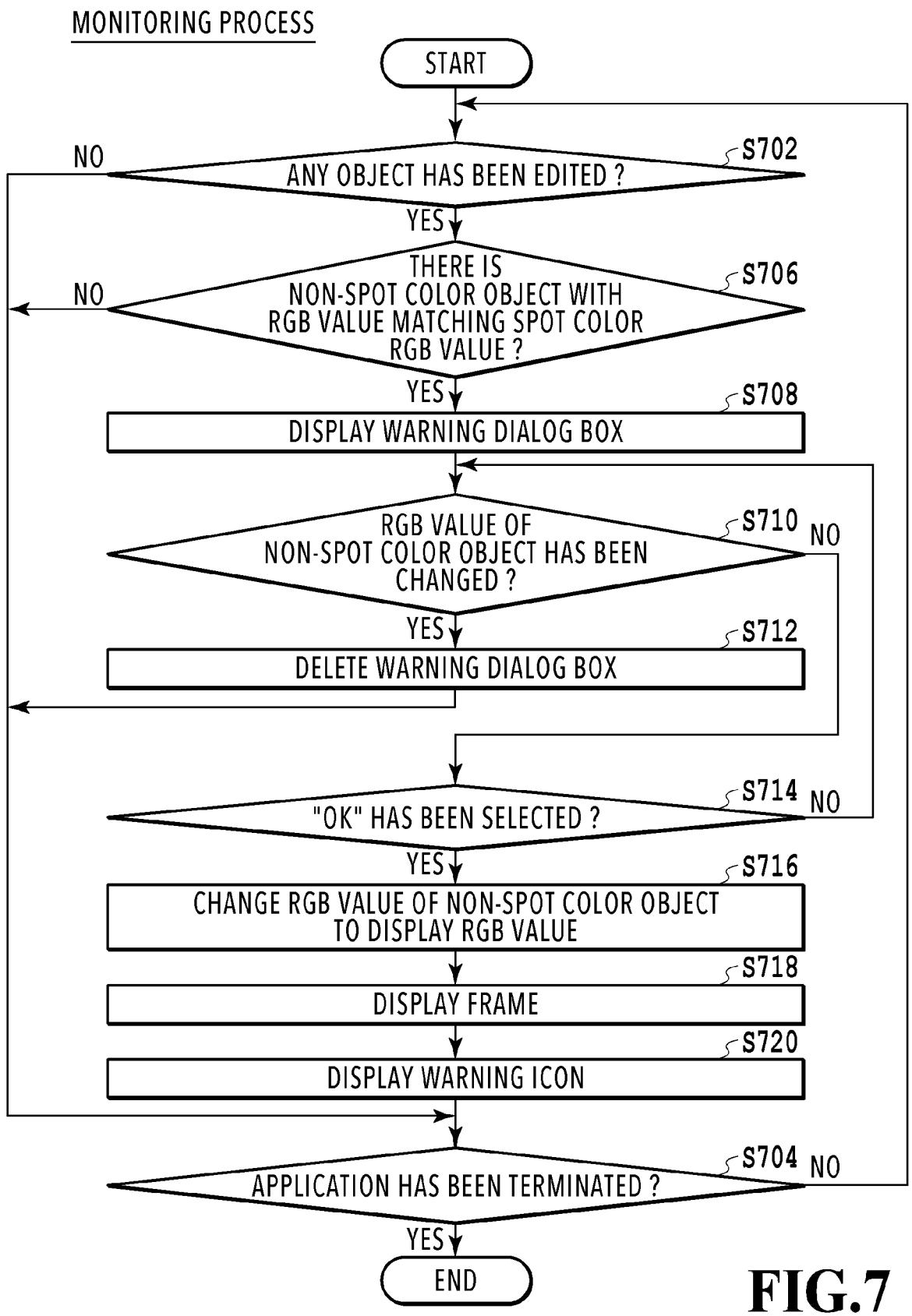
FIG. 7 is a flowchart of a monitoring process by an information processing apparatus according to another embodiment.
Figure 8:
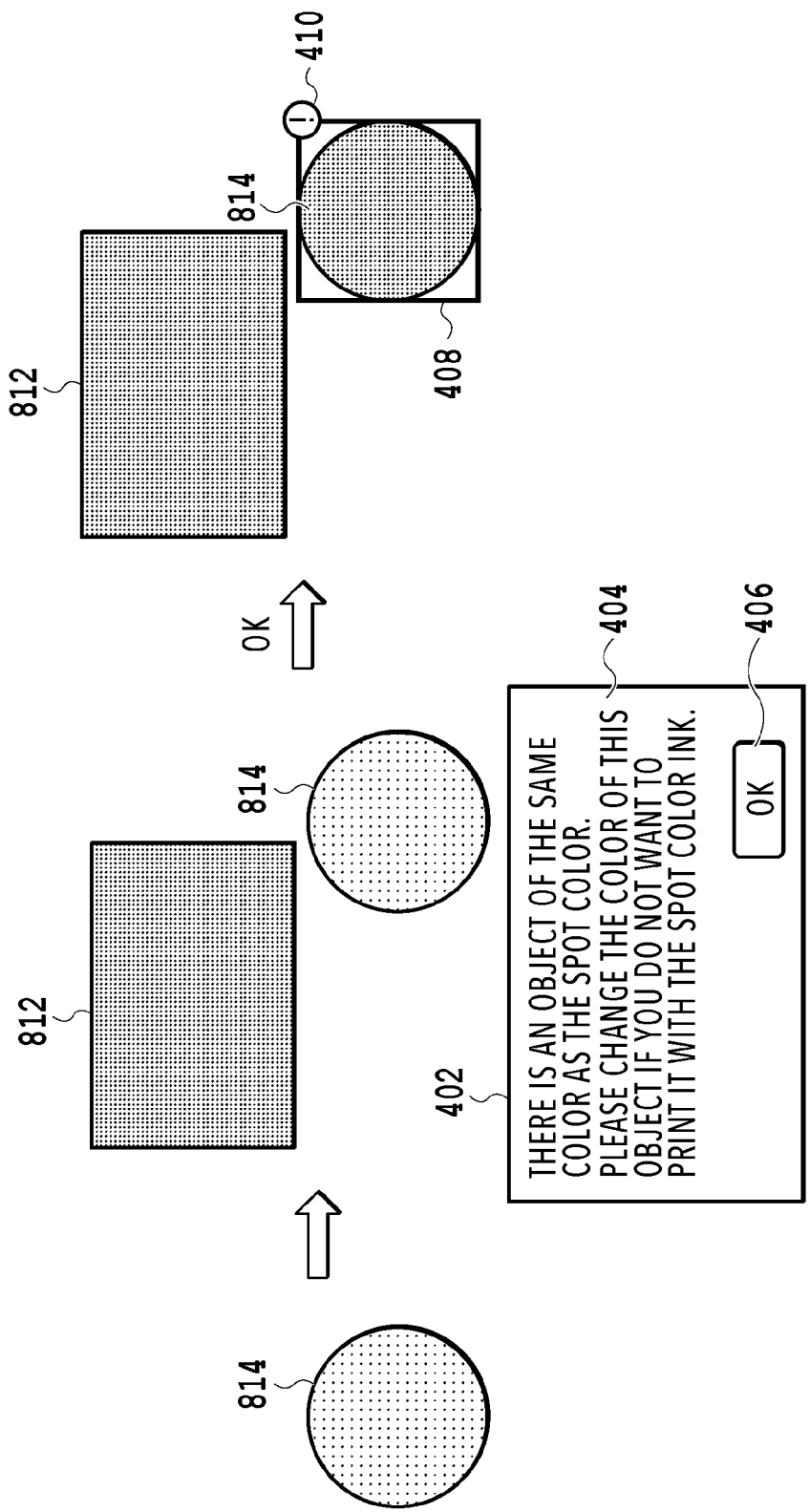
FIG. 8 is a diagram illustrating a display example of a warning dialog box, a frame, and a warning icon by an information processing apparatus according to this other embodiment.

Next, an information processing apparatus according to a second embodiment will be described with reference to FIGS. 7 and 8. In the following description, for identical or corresponding components to those in the information processing apparatus according to the above first embodiment, specific description thereof will be omitted by using the identical reference signs to those used in the first embodiment.

The second embodiment differs from the above first embodiment in that a warning dialog box is displayed in a case where a spot color object set at a spot color RGB value matching the RGB value of a non-spot color object present in an image is generated during editing of the image.

A monitoring process executed by the information processing apparatus 10 according to the present embodiment will be described in detail below. Note that details of a display process to be performed in parallel with the monitoring process are the same as those in the above first embodiment, and description thereof will therefore be omitted. FIG. 7 is a flowchart illustrating a specific processing routine in the monitoring process executed by the information processing apparatus according to the present embodiment. FIG. 8 is a diagram illustrating a display example of a warning dialog box by the information processing apparatus according to the present embodiment.

In response to the start of the monitoring process, the CPU 12 firstly determines whether any object has been edited in the editing screen based on inputs from the input devices such as the keyboard 22 and the pointing device 24 (S702). If determining in S702 that no object has been edited, the CPU 12 determines whether the application 204 has been terminated (S704), and returns to S702 if determining that the application has not been terminated. If determining in S704 that the application 204 has been terminated, the CPU 12 terminates this monitoring process.

If determining in S702 that an object has been edited, the CPU 12 determines whether there is a non-spot color object with an RGB value snatching a spot color RGB value set for a spot color object present in the image (S706). Specifically, in S706, the CPU 12 determines whether there is a non-spot color object with an RGB value matching the spot color RGB value of a spot color object added.

If determining in S706 that there is no non-spot color object with an RGB value matching a spot color RGB value set for a spot color object added, the CPU 12 proceeds to S704. If determining in S706 that there is a non-spot color object with an RGB value matching a spot color RGB value set for a spot color object added, the CPU 12 displays the warning dialog box 402 (708). For example, as illustrated in FIG. 8, in a case where a spot color object 812 has been added to an image and a non-spot color object 814 with an RGB value matching its spot color RGB value is present in the image, the warning dialog box 402 is displayed near the non-spot color object. The display position of the warning dialog box 402 may be any position as long as it is within the editing screen. Also, the warning dialog box 402 may be displayed such that the spot color object and non-spot color object of interest are displayed an easily visually recognizable manner by using a publicly known technique.

In the case where the warning dialog box 402 is displayed, the CPU 12 subsequently determines whether the RGB value of the non-spot color object matching the spot color RGB value has been changed (S710). If determining in S710 that the RGB value of the non-spot color object has been changed, the CPU 12 deletes the warning dialog box 102 (S712) and proceeds to S704. In S712, the CPU 12 deletes the frame 408 and the warning icon 410 along with the warning dialog box 402. If determining in S710 that the RGB value of the non-spot color object has not been changed, the CPU 12 determines whether the "OK" selection button 406 has been selected (S714).

If determining in S714 that the "OK" selection button 406 has not been selected, the CPU 12 returns to S710. If determining in S714 that the "OK" selection button 406 has been selected, the CPU 12 changes the RGB value of the non-spot color object matching the spot color RGB value to the display RGB value of the spot color object for which the spot color RGB value is set (S716), That is, in S716, the CPU 12 changes the RGB value of the non-spot color object matching the spot color RGB value to an RGB value matching the display RGB value of the spot color object for which the spot color RGB value is set. Thereafter, as illustrated in FIG. 8, the CPU 12 displays the frame 408 around the non-spot color object whose RGB value has been changed to the display RGB value (S718), displays the warning icon 410 on the frame 408 (S720), and then proceeds to S704.

As described above, the information processing apparatus 10 according to the present embodiment displays the warning dialog box 402 in a similar manner to the above first embodiment also in the case where a spot color object is added to an image containing a non-spot color object with an RGB value matching its spot color RGB value. In this way, the same advantage as that of the above first embodiment is achieved not only in the case of adding a non-spot color object but also in the case of adding a spot color object.

Third Embodiment

Next, an information processing apparatus according to a third embodiment will be described with reference to FIGS. 9 to 11B. In the following description, for identical or corresponding components to those in the information processing apparatus according to the above first embodiment, specific description thereof will be omitted by using the identical reference signs to those used in the first embodiment.

The third embodiment differs from the above embodiments in that a change confirmation dialog box is displayed in a case where an image is edited to contain a spot color object and a non-spot color object with an RGB value matching the spot color RGB value of this spot color object.

A monitoring process executed by the information processing apparatus 10 according to the present embodiment will be described in detail below. Note that details of a display process to be performed in parallel with the monitoring process are the same as those in the above first embodiment, and description thereof will therefore be omitted. Also, the following description will be given by taking as an example a case of adding a non-spot color object with an RGB value matching a spot color RGB value, which corresponds to the above first embodiment. However, the situation where the change confirmation dialog box is displayed is not limited to this case. Specifically, the change confirmation dialog box may be displayed in a case of adding a spot color object for which a spot color RGB value matching the RGB value of a non-spot color object is set, which corresponds to the above second embodiment.

Figure 9:
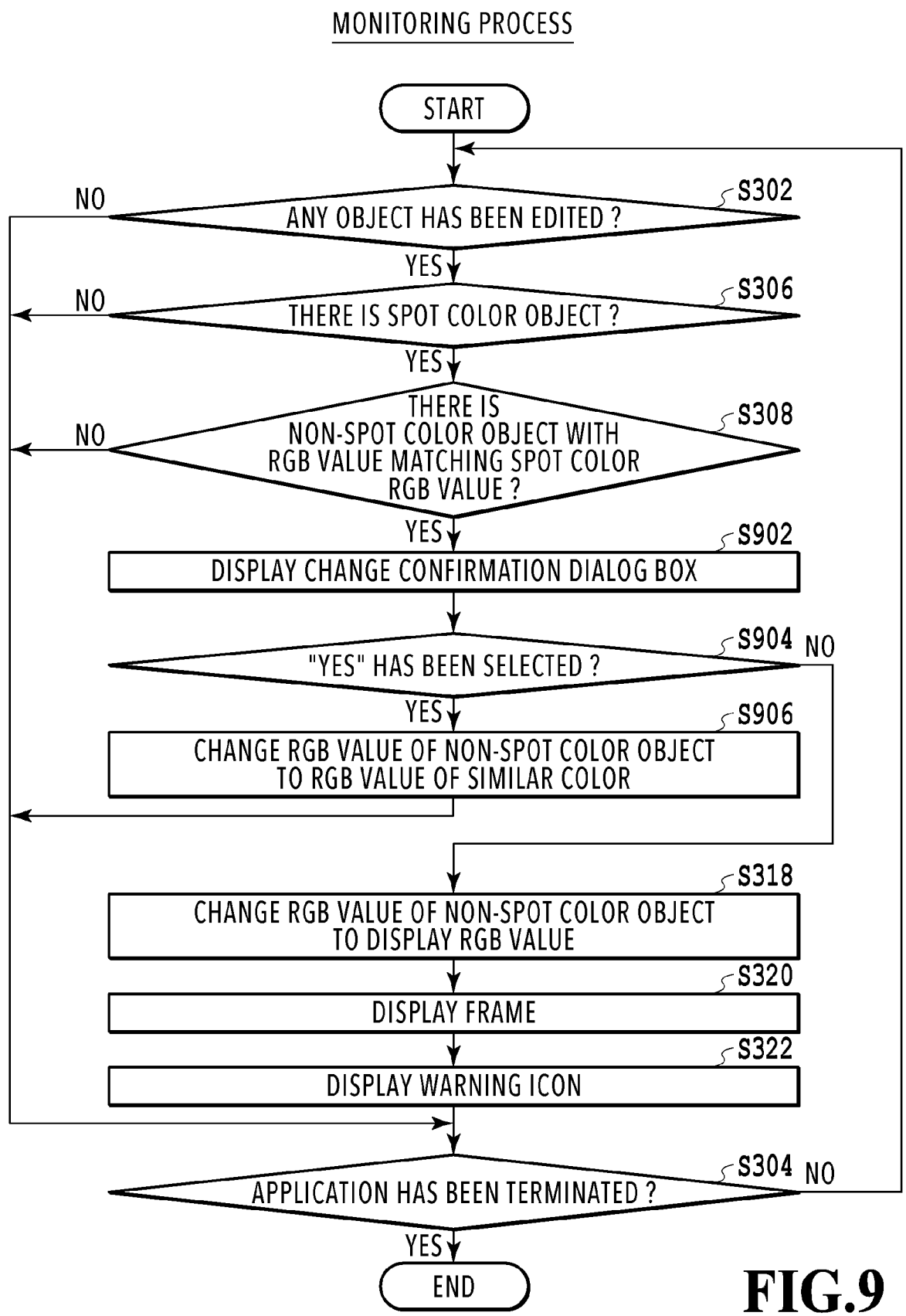
FIG. 9 is a flowchart of a monitoring process by an information processing apparatus according to another embodiment.
Figure 10:
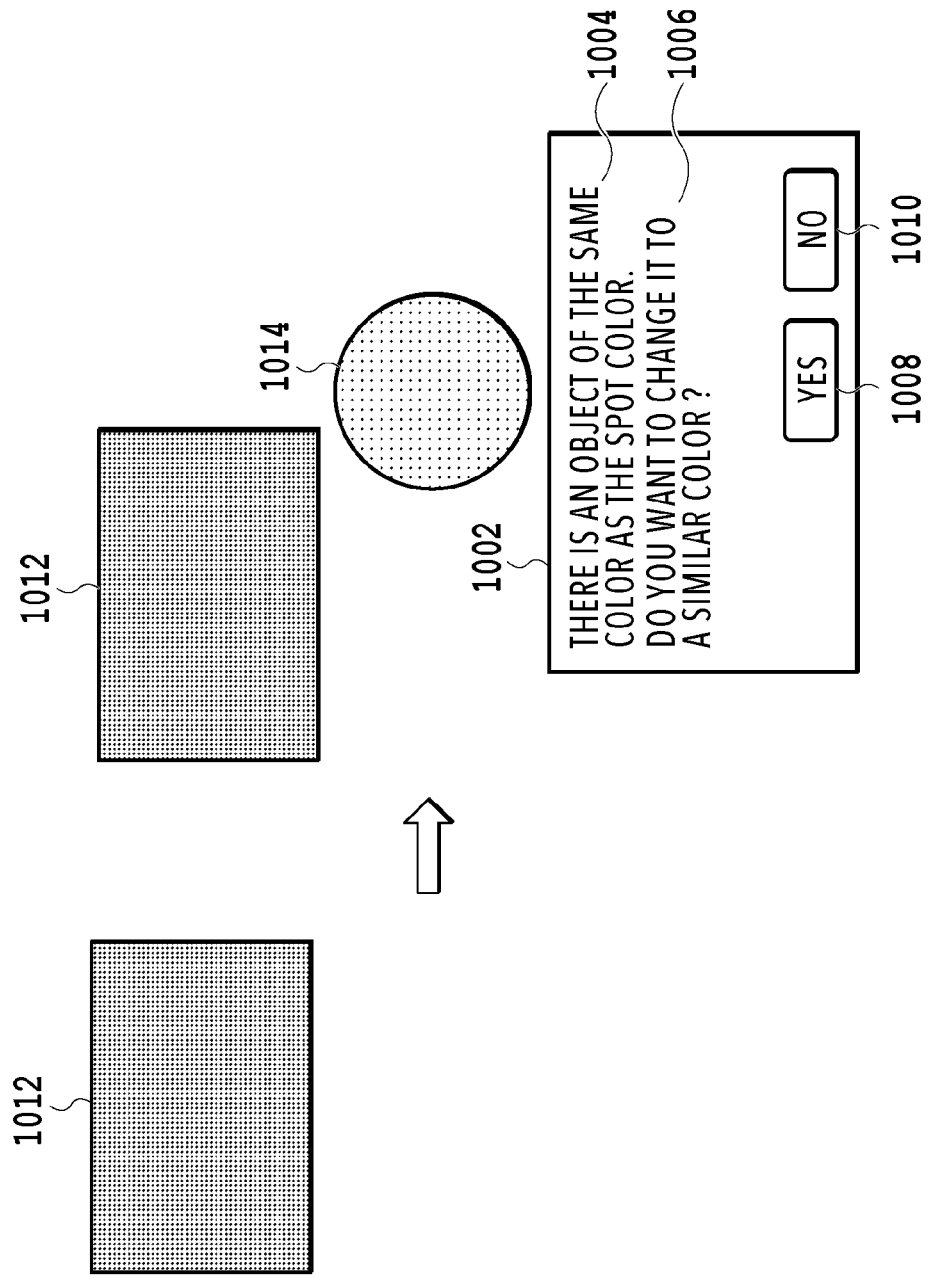
FIG. 10 is a diagram illustrating a display example of a change confirmation dialog box by the information processing apparatus according to this other embodiment.
Figure 11A:
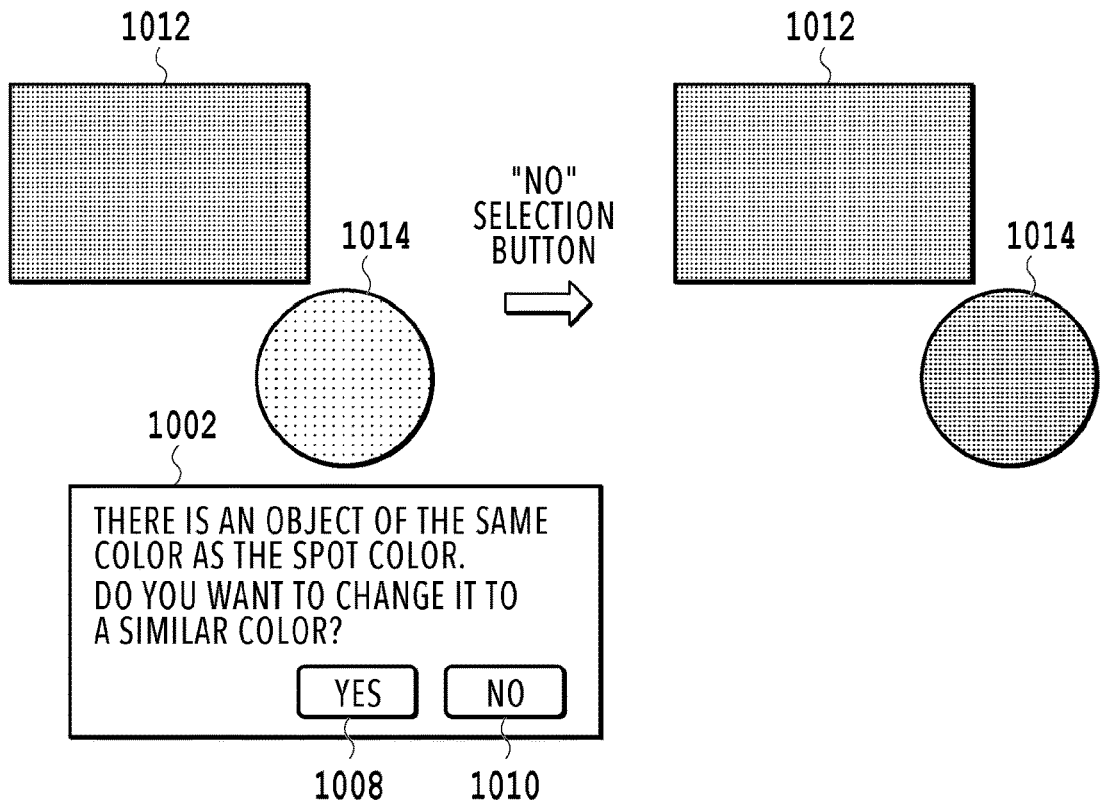
FIGS. 11A and 11B are diagrams each illustrating how a non-spot color object changes in response to selecting a selection button.
Figure 11B:
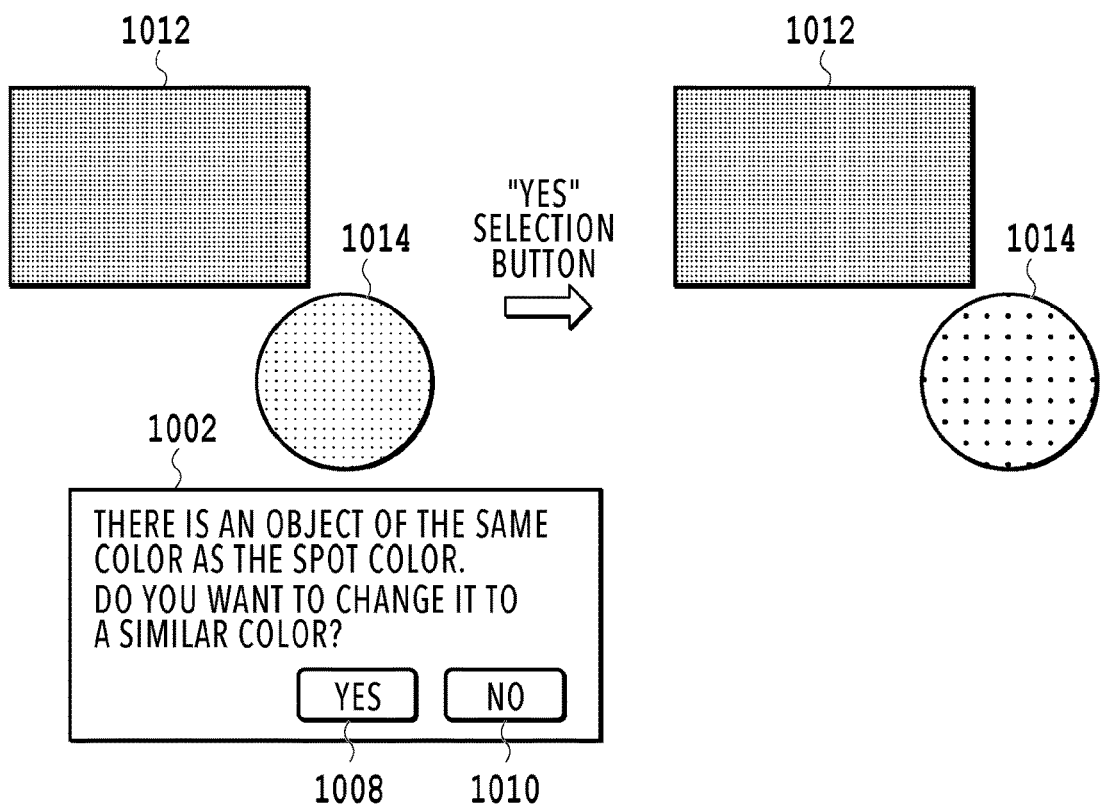

FIG. 9 is a flowchart illustrating a specific processing routine in the monitoring process executed by the information processing apparatus according to the present embodiment. FIG. 10 is a diagram illustrating a display example of the change confirmation dialog box. FIG. 11A is a diagram illustrating how a non-spot color object changes in a case of selecting a "NO" selection button whereas FIG. 11B is a diagram illustrating how the non-spot color object changes in a case of selecting a "YES" selection button. In the description of the monitoring process using FIG. 9, for the same processes as those in the monitoring process in FIG. 3, specific description thereof will be omitted by using the same step numbers as those used in the flowchart of the monitoring process in FIG. 3.

In response to the start of the monitoring process, the CPU 12 firstly determines in S302 whether any object has been edited in the editing screen based on inputs from the input devices such as the keyboard 22 and the pointing device 24. If determining that no object has been edited, the CPU 12 proceeds to S304, in which it determines whether the application 204 has been terminated. If determining in S304 that the application 204 has not been terminated, the CPU 12 returns to S302 and, if determining that the application has been terminated, terminates this monitoring process.

If, on the other hand, determining in S302 that an object has been edited, the CPU 12 proceeds to S306, in which it determines whether there is a spot color object in the image. If determining that there is no spot color object in the image, the CPU 12 proceeds to S304 and, if determining that there is a spot color object in the image, proceeds to S308 In S308, the CPU 12 determines whether there is a non-spot color object with an RGB value matching the spot color RGB value set for the spot color object present in the image. If determining in S308 that there is not any non-spot color object as above, the CPU 12 proceeds to S304. If determining in S308 that there is a non-spot color object as above, the CPU 12 displays a change confirmation dialog box 1002 (S902).

For example, as illustrated in FIG. 10, in a case where a spot color object 1012 is present in an image and a non-spot color object 1014 with an RGB value matching its spot color RGB value is added to the image, the change confirmation dialog box 1002 is displayed near the non-spot color object 1014. The display position of the change confirmation dialog box 1002 may be any position as long as it is displayed within the editing screen. Also, the change confirmation dialog box 1002 may be displayed such that the spot color object and non-spot color object of interest are displayed an easily visually recognizable manner by using a publicly known technique.

In the change confirmation dialog box 1002, a warning sentence 1004 is displayed which indicates that there is a non-spot color object with an RGB value matching the spot color RGB value of the spot color object present in the image. Moreover, in the change confirmation dialog box 1002, a notification 1006 asking whether to convert the color of the non-spot color object identified in the warning sentence 1004. Furthermore, in the change confirmation dialog box 1002, a "YES" selection button 1008 and a. "NO" selection button 1010 are displayed as options associated with the notification 1006. In the present embodiment, the notification 1006 asks the user whether to change the color of the non-spot color object to one similar to the RGB value matching the spot color RGB value.

If the change confirmation dialog box 1002 is displayed, the CPU 12 then determines whether the "YES" selection button 1008 has been selected (S904). If determining in S904 that the "YES" selection button 1008 has not been selected, in other words, the "NO" selection button 1010 has been selected, the CPU 12 changes the RGB value of the non-spot color object to a display RGB value, as illustrated in FIG. 11A. (S318), Thereafter, the CPU 12 displays the frame 408 around the non-spot color object whose RGB value has been changed to the display RGB value (S320), displays the warning icon 410 on the frame 408 (S322), and then proceeds to S304.

If, on the other hand, determining in S904 that the "YES" selection button 1008 has been selected, the CPU 12 changes the RGB value of the non-spot color object matching the spot color RGB value to an RGB value representing a similar color to it, as illustrated in FIG. 11B (S906), and then proceeds to S304. The RGB value representing a similar color is a color with the RGB value in the RGB color space and is the closest to white among the RGB values which are the closest to the spot color RGB value among the RGB values at a color distance of 96 or greater from the spot color RGB value and whose R, G, and B values have equal absolute values of difference. Incidentally, white refers to (R,G,B)=(255,255,255). Note that the RGB value representing a similar color is not limited to the above RGB value, and may be a predetermined RGB value other than the above similar color, or the configuration may be such that the RGB value can be changed as appropriate.

As described above, the information processing apparatus 10 according to the present embodiment displays the change confirmation dialog box 1002 in the case where a spot color object and a non-spot color object with an RGB value matching the spot color RGB value of this spot color object are present together. This change confirmation dialog box gives a notification regarding changing the RGB value of the non-spot color object matching the spot color RGB value along with a warning sentence indicating that the non-spot color object is present. In the present embodiment, the notification regarding the change is a notification asking whether to change the color, i.e., the RGB value, of the non-spot color object to a similar RGB value. If the "YES" selection button 1008, which represents an option associated with the notification regarding the change, is then selected, the RGB value of the non-spot color object is changed to the RGB value of the similar color. If the "NO" selection button 1010, which is also an option associated with the notification regarding the change, is selected, the RGB value of the non-spot color object is changed to the display RGB value. If the RGB value of the non-spot color object is changed to the display RGB value, the frame 408 and the warning icon 410 are displayed around the non-spot color object. In this way, the user can not only enjoy the advantage of the above first embodiment but also skip the work of changing the color of the non-spot color object, which improves the workability. Also, by displaying the similar color to the color set by the user, an image reflecting the user's intention is displayed.

Other Embodiments

Note that the above embodiments may be modified as described in (1) to (8) below.

(1) In the above embodiments, the warning dialog box 402 or the change confirmation dialog box 1002 is displayed in a case where a spot color object or a non-spot color object is added. However, the situation where these dialog boxes are displayed is not limited to the above. Specifically, the above dialog boxes may be displayed in a case where a spot color object or a non-spot color object positioned under an object is displayed as a result of another editing process such as enlarging, reducing, deleting, or moving the object.

(2) in the above embodiments, in the display process, the warning message 602 is displayed in response to mouseover on the warning icon 410, However, the process for displaying the warning message 602 is not limited to the above. Specifically, the warning message 602 may be displayed by clicking, i.e., selecting, the warning icon 410, for example, and any of various publicly known techniques using the warning icon 410 can be utilized for the process of displaying the warning message 602.

(3) In the above embodiments, the frame 408 is provided around a non-spot color object whose RGB value has been changed to a display RGB value and the warning icon 410 is provided on the frame 408, However, the way they are provided is not limited to the above. That is, at least one of the frame 408 or the warning icon 410 may be provided around or on the non-spot color object whose RGB value has been changed to the display RGB value. Specifically, only the frame 408 may be provided or only the warning icon 410 may be provided. In the case of providing only the warning icon 410, the warning icon 410 may be provided on the non-spot color object, for example. In the case of providing only the frame 408, the warning message 602 may be displayed in response to mouseover on the frame 408.

(4) In the above embodiments, a display RGB value and a spot color RGB value are set for each spot color object. However, the settings are not limited to the above. Specifically, the spot-color color information described as a spot color RGB value in the above embodiments may be a value in any of various publicly known color spaces. In this case too, the display color information is an RGB value. Also, in the above embodiments, the warning dialog box gives a warning indicating that there is a non-spot color object with an RGB value matching a spot color RGB value and a notification regarding changing the RGB value of the non-spot color object. However, the contents of the warning dialog box are not limited to the above. The warning dialog box may give one of the above warning or the above notification.

(5) In the above embodiments, in the case where the "OK" selection button or the "NO" selection button in the warning dialog box is selected, a change is made to a non-spot color object with an RGB value matching a spot color RGB value such that the RGB value is changed to a display RGB value. However, the RGB value after the change is not limited to the display RGB value. The RGB value after the change may be any RGB value as long as it is different from the spot color RGB value, though a color not used for the other objects is preferable. In this case, the RGB value after the change is set in advance.

(6) The present invention can be implemented by providing a program that implements one or more of the functions of the above embodiments to a system or an apparatus via a network or a print medium, and causing one or more processors in a computer of the system or the apparatus to read out and execute the program. Alternatively, the present invention can be implemented with a circuit (e.g., ASIC) that implements one or more of the functions.

(7) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(8) The various configurations described in the above embodiments and (1) to (7) above may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-083082, filed May 17, 2021, which is hereby incorporated by reference wherein in its entirety.

What is claimed is:

1. An information processing method comprising:
allowing editing of an object displayed in a predetermined display region; and
changing a display in the predetermined display region based on a content of the editing in the allowing editing, wherein the allowing editing includes allowing editing of:
a spot color object for which spot-color color information associated with a spot color is set and which is to be printed by using at least a spot color ink according to the spot-color color information, and
a non-spot color object which has predetermined color information and is to be printed not by using the spot color ink but by using a normal ink, which is not the spot color ink, according to the predetermined color information, and
the information processing method further comprises giving a notification based on the fact that the spot color object and the non-spot color object having color information matching the spot-color color information of the spot color object are present in the predetermined display region by the editing, wherein the notification includes a prompt to change the color information non-spot color object, and wherein the notification comprises a button for completing the notification,
wherein the color information of the non-spot color object is changed to preset color information in the editing based on a selection of the button.

2. The information processing method according to claim 1, wherein the notification is at least one of a notification indicating that the non-spot color object having the color information matching the spot-color color information is present or a notification regarding changing the color information of the non-spot color object.

3. The information processing method according to claim 1, wherein
for the spot color object, display color information for displaying the spot color object in the predetermined display region is further set, and
the preset color information is the display color information.

4. The information processing method according to claim 1, wherein the allowing editing includes providing a frame surrounding the non-spot color object whose color information has been changed to the preset color information, and a warning icon calling for attention.

5. The information processing method according to claim 4, wherein the giving a notification includes notifying of a message indicating that the spot-color color information has been set for the non-spot color object, in response to a process on the warning icon.

6. The information processing method according to claim 5, wherein the process on the warning icon is mouseover.

7. The information processing method according to claim 1, further comprising outputting image data to which the content of the editing has been applied to a printing apparatus capable of performing printing using at least the spot color ink based on the image data.

8. The information processing method according to claim 1, wherein the editing in the allowing editing includes at least one of changing a position of an object, changing a size of an object, adding an object, changing a color of an object, or deleting an object.

9. The information processing method according to claim 1, wherein the spot color ink is an ink of a color different from a process color.

10. The information processing method according to claim 9, wherein the spot color ink includes an ink that develops at least one of a fluorescent color, a gold color, or a silver color.

11. The information processing method according to claim 1, wherein the normal ink includes at least one of a cyan ink, a magenta ink, a yellow ink, or a black ink.

12. The information processing method according to claim 1, wherein the color information is an RGB value.

13. An information processing apparatus which comprises an editing unit capable of editing an object displayed in a predetermined display region, and which changes a display in the predetermined display region based on a content of the editing by the editing unit, wherein the editing unit is capable of editing:
a spot color object for which spot-color color information associated with a spot color is set and which is to be printed by using at least a spot color ink according to the spot-color color information, and
a non-spot color object which has predetermined color information and is to be printed not by using the spot color ink but by using a normal ink, which is not the spot color ink, according to the predetermined color information, and
the information processing apparatus further comprises a notification unit that gives a notification based on the fact that the spot color object and the non-spot color object having color information matching the spot-color color information of the spot color object are present in the predetermined display region by the editing by the editing unit, wherein the notification includes a prompt to change the color information of the non-spot color object, and wherein the notification comprises an indication of a button for completing the notification, wherein the editing unit changes the non-spot color object to preset color information based on a selection of the button.

14. A non-transitory computer readable storage medium storing a program for causing a computer to function as an information processing apparatus which comprises an editing unit capable of editing an object displayed in a predetermined display region, and which changes a display in the predetermined display region based on a content of the editing by the editing unit, wherein the editing unit is capable of editing:

a spot color object for which spot-color color information associated with a spot color is set and which is to be printed by using at least a spot color ink according to the spot-color color information, and a non-spot color object which has predetermined color information and is to be printed not by using the spot color ink but by using a normal ink, which is not the spot color ink, according to the predetermined color information, and the information processing apparatus further comprises a notification unit that gives a notification based on the fact that the spot color object and the non-spot color object having color information matching the spot-color color information of the spot color object are present in the predetermined display region by the editing by the editing unit, wherein the notification includes a prompt to change the color information of the non-spot color object, and wherein the notification comprises an indication of a button for completing the notification, wherein the editing unit changes the non-spot color object to preset color information based on a selection of the button.

* * * * *